United States Patent
Jain et al.

(10) Patent No.: US 12,248,361 B2
(45) Date of Patent: Mar. 11, 2025

(54) PARALLELIZED EXCEPTION HANDLING FOR LARGE DATASETS

(71) Applicant: ServiceNow, Inc., Santa Clara, CA (US)

(72) Inventors: Rahul Surendra Jain, Bangalore (IN); Rashmi Toparapu, Hyderabad (IN); Prabhat Mishra, Hyderabad (IN); P Rajshekar Reddy, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/228,108

(22) Filed: Jul. 31, 2023

(65) Prior Publication Data

US 2025/0045138 A1 Feb. 6, 2025

(51) Int. Cl.
*G06F 11/00* (2006.01)
*G06F 11/07* (2006.01)

(52) U.S. Cl.
CPC ................ *G06F 11/0772* (2013.01)

(58) Field of Classification Search
CPC .......... G06F 11/0772; G06F 11/0766
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |

(Continued)

FOREIGN PATENT DOCUMENTS

| | | |
|---|---|---|
| EP | 0433979 A2 | 6/1991 |
| EP | 1607824 A2 | 12/2005 |

(Continued)

*Primary Examiner* — Jonathan D Gibson
(74) *Attorney, Agent, or Firm* — McDonnell Boehnen Hulbert & Berghoff LLP

(57) ABSTRACT

Example embodiments relate to parallelized exception handling for large datasets. One example embodiment includes a method. The method includes retrieving one or more sets of entries to be analyzed. The method also includes selecting an available computing resource. In addition, the method includes causing the available computing resource to perform an analysis of each entry within the respective set of entries to identify previously defined exceptions. Further, the method includes causing, for each entry within the respective set of entries, a list of exceptions associated with the respective entry to be created or updated based on the analysis. Additionally, the method includes causing, for each entry within the respective set of entries, metadata associated with the respective entry to be updated when the list of exceptions associated with the respective entry indicates that no exceptions are associated with the respective entry.

20 Claims, 9 Drawing Sheets

(56) References Cited

U.S. PATENT DOCUMENTS

| | | |
|---|---|---|
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,512,564 B1 | 3/2009 | Geer |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 9,947,055 B1 | 4/2018 | Roumeliotis |
| 10,268,507 B2 | 4/2019 | Wardell |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,093,321 B1 * | 8/2021 | Zeavelou ............ G06F 11/0793 |
| 11,095,506 B1 | 8/2021 | Erblat |
| 11,146,614 B2 | 10/2021 | Felderman |
| 11,182,098 B2 | 11/2021 | Stevens |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,632,303 B2 | 4/2023 | Bitterfeld |
| 11,640,369 B2 | 5/2023 | Bhogle |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Matthew |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0040249 A1 | 2/2008 | Re |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2010/0306094 A1 | 12/2010 | Homer |
| 2011/0314229 A1 * | 12/2011 | Miller .................. G06F 11/004 |
| | | 711/E12.001 |
| 2012/0297016 A1 * | 11/2012 | Iyer ........................ H04L 43/06 |
| | | 709/217 |
| 2018/0123940 A1 | 5/2018 | Rimar |
| 2019/0073257 A1 | 3/2019 | Dasgupta |
| 2019/0104398 A1 | 4/2019 | Owen |
| 2020/0050689 A1 | 2/2020 | Tal |
| 2020/0204443 A1 | 6/2020 | Bar Oz |
| 2020/0301678 A1 | 9/2020 | Burman |
| 2021/0073097 A1 * | 3/2021 | Upadhyay ........... G06F 11/0757 |
| 2021/0194764 A1 | 6/2021 | Badyan |
| 2022/0029886 A1 | 1/2022 | Hameiri |
| 2022/0100598 A1 * | 3/2022 | Surply ................ G06F 11/3065 |
| 2022/0179684 A1 * | 6/2022 | Tsirkin ................ G06F 11/0772 |
| 2022/0350692 A1 * | 11/2022 | Chilamakuri ....... G06F 11/0709 |
| 2023/0161659 A1 * | 5/2023 | Misra .................. G06F 11/0772 |
| | | 714/48 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

PARALLELIZED EXCEPTION HANDLING FOR LARGE DATASETS

BACKGROUND

In some circumstances, data associated with a database entry (e.g., username, contact information, etc.) may be reviewed prior to the dissemination of sensitive information. Reviewing the data can be a resource intensive task (e.g., in terms of memory and processing resources), particularly when the database contains a large number of data entries. This can be problematic when time delays can result in delayed diagnosis (e.g., when the data represents test results for a patient) or in some form of penalty (e.g., due to deadlines being missed). Further, available computing resources may be insufficient to process the resource intensive tasks.

SUMMARY

Various implementations disclosed herein include an exception engine that systematically flags entries within databases (or other data structures) when one or more previously defined exception types are present within those entries. The exception engine may identify the available computing resources usable to analyze the entries within a database for exceptions. Then, based on the available computing resources and the number of entries, the exception engine may divide the entries into different sets. Each of the sets may be reviewed for exceptions parallel of one another (e.g., by different processor threads), which allows for enhanced processing of the entries as well as control over the computing resources allocated to the overall task.

Further, the exception engine may be executed repeatedly (e.g., according to a predefined period) such that the statuses of exceptions within the entries are regularly updated. For example, if one or more exceptions are flagged within a given entry, those exceptions may then be corrected. Once all exceptions associated with a given entry have been cleared, the entry may move on to a subsequent step in processing. By combining parallelization and periodic review of the statuses of entries for exceptions, the overall timeline for processing entries can be dramatically reduced (e.g., by eliminating downtime when an entry contains no exceptions but has not yet been moved to a further downstream step and/or by rapidly flagging exceptions for review) while still throttling the rate of the overall task to match available computing resources.

Accordingly, a first example embodiment may involve a method. The method may include retrieving one or more sets of entries to be analyzed. The one or more sets of entries may be within a database structure. The method may also include, for each of the one or more sets of entries, selecting an available computing resource. Additionally, the method may include, for each of the one or more sets of entries, causing the available computing resource to perform an analysis of each entry within the respective set of entries to identify previously defined exceptions. Further, the method may include, for each of the one or more sets of entries, causing, for each entry within the respective set of entries, a list of exceptions associated with the respective entry to be created or updated based on the analysis. In addition, the method may include, for each of the one or more sets of entries, causing, for each entry within the respective set of entries, metadata associated with the respective entry to be updated when the list of exceptions associated with the respective entry indicates that no exceptions are associated with the respective entry. Updating the metadata associated with respective entry may include providing an indication that the respective entry does not require further exception analysis.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
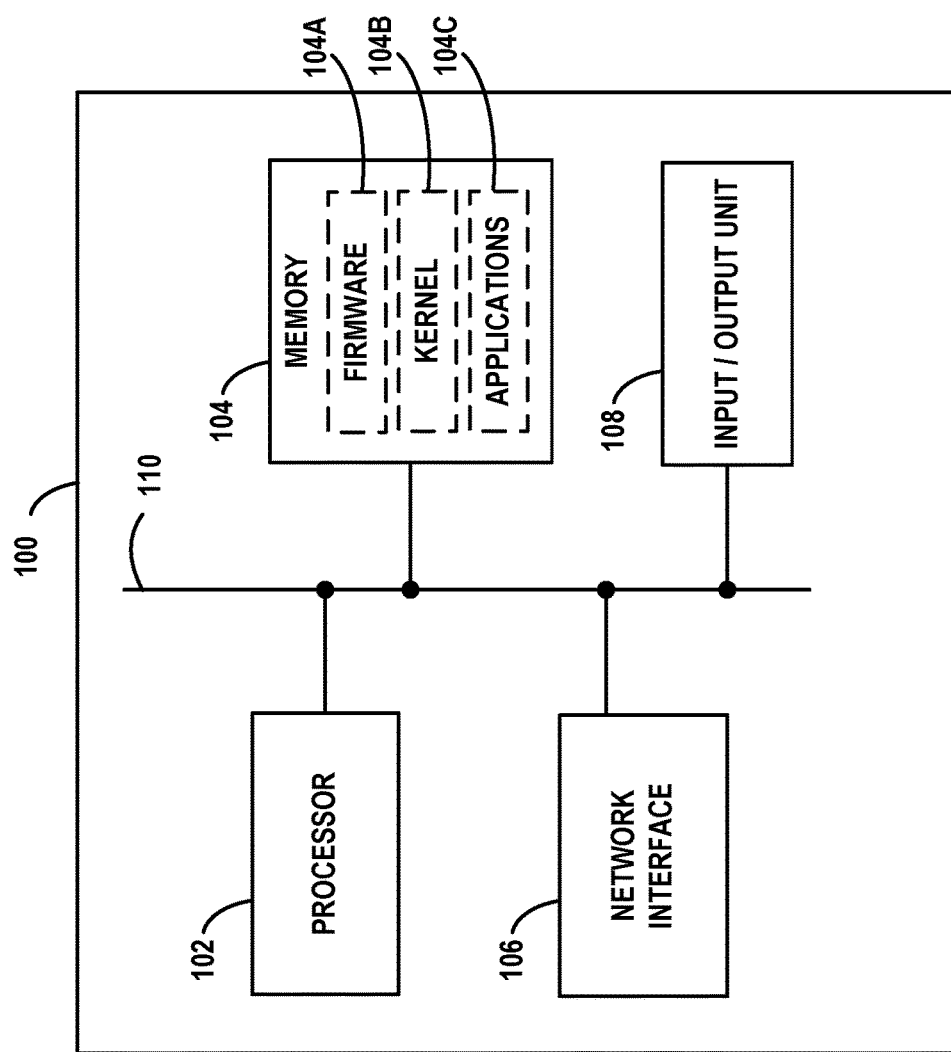
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
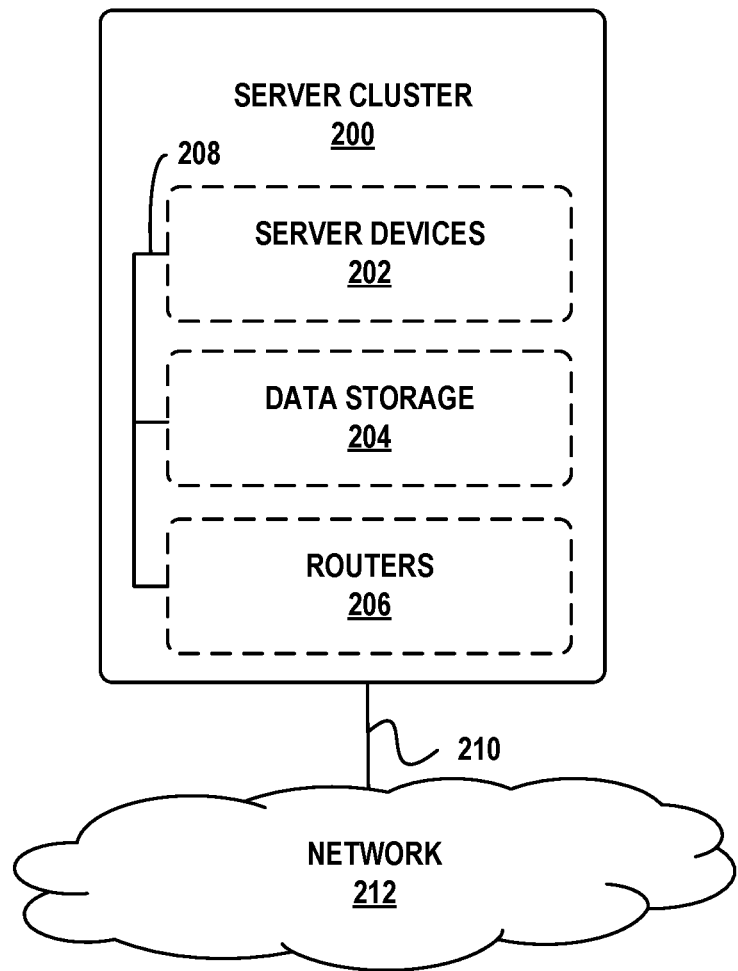
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
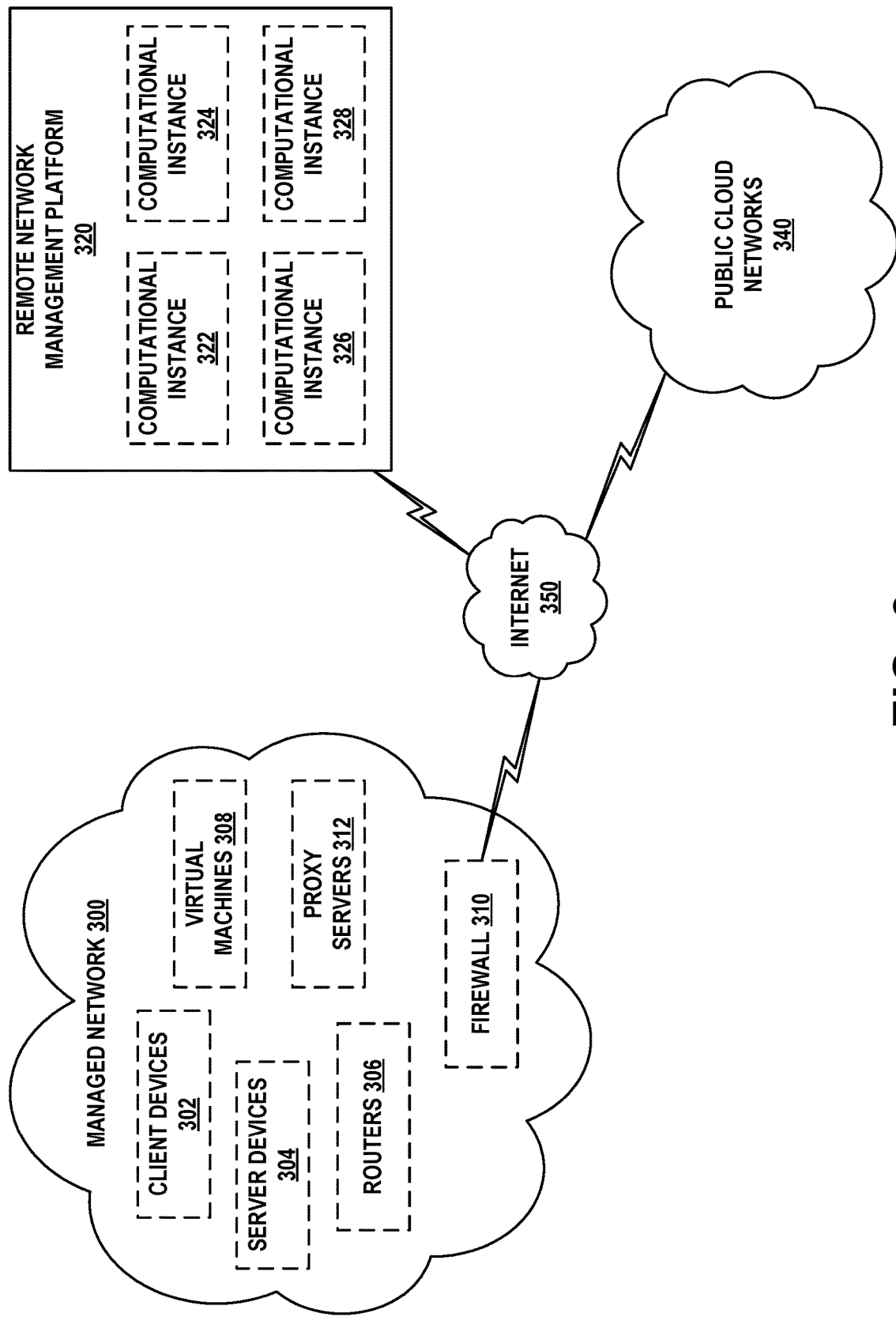
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
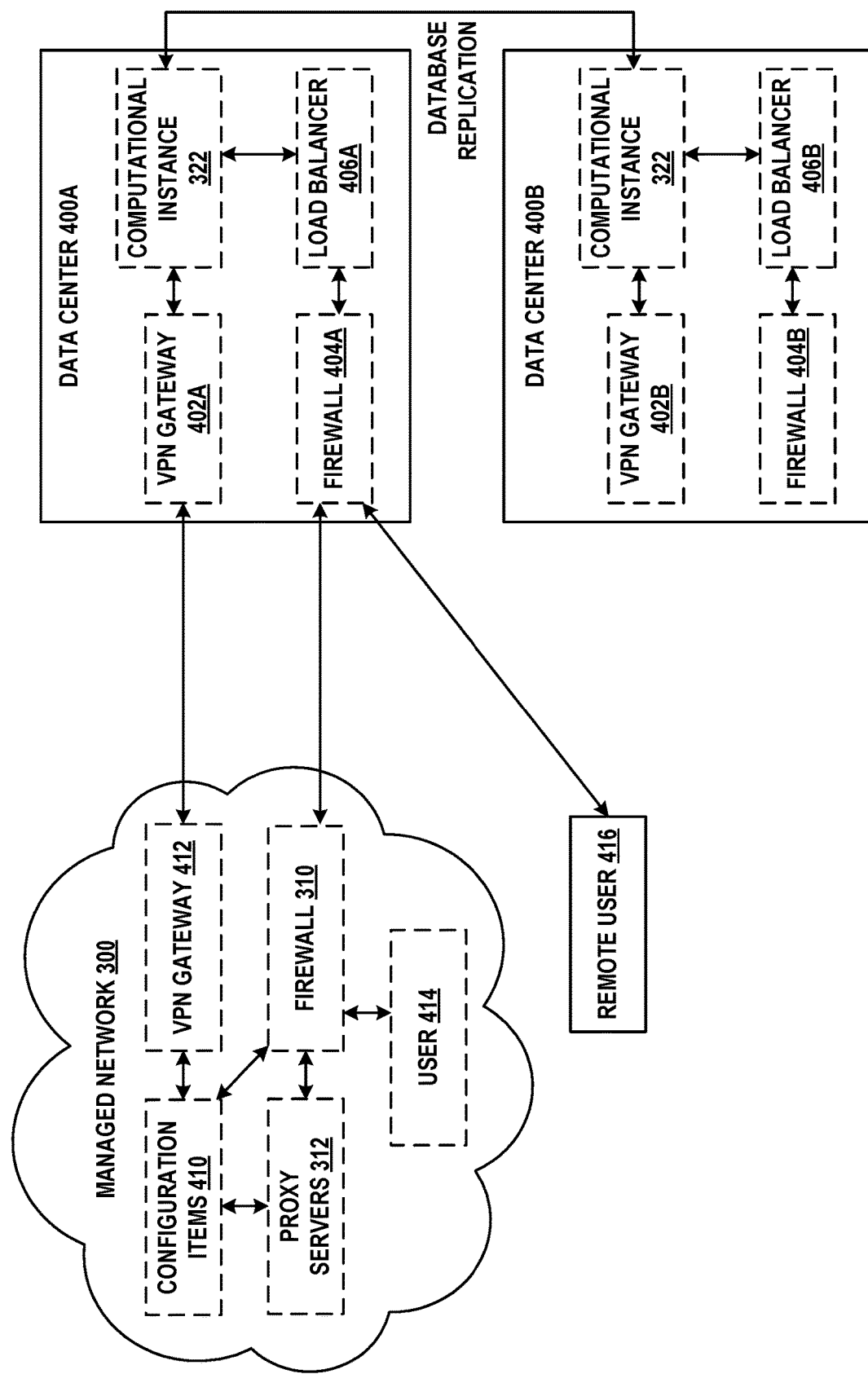
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
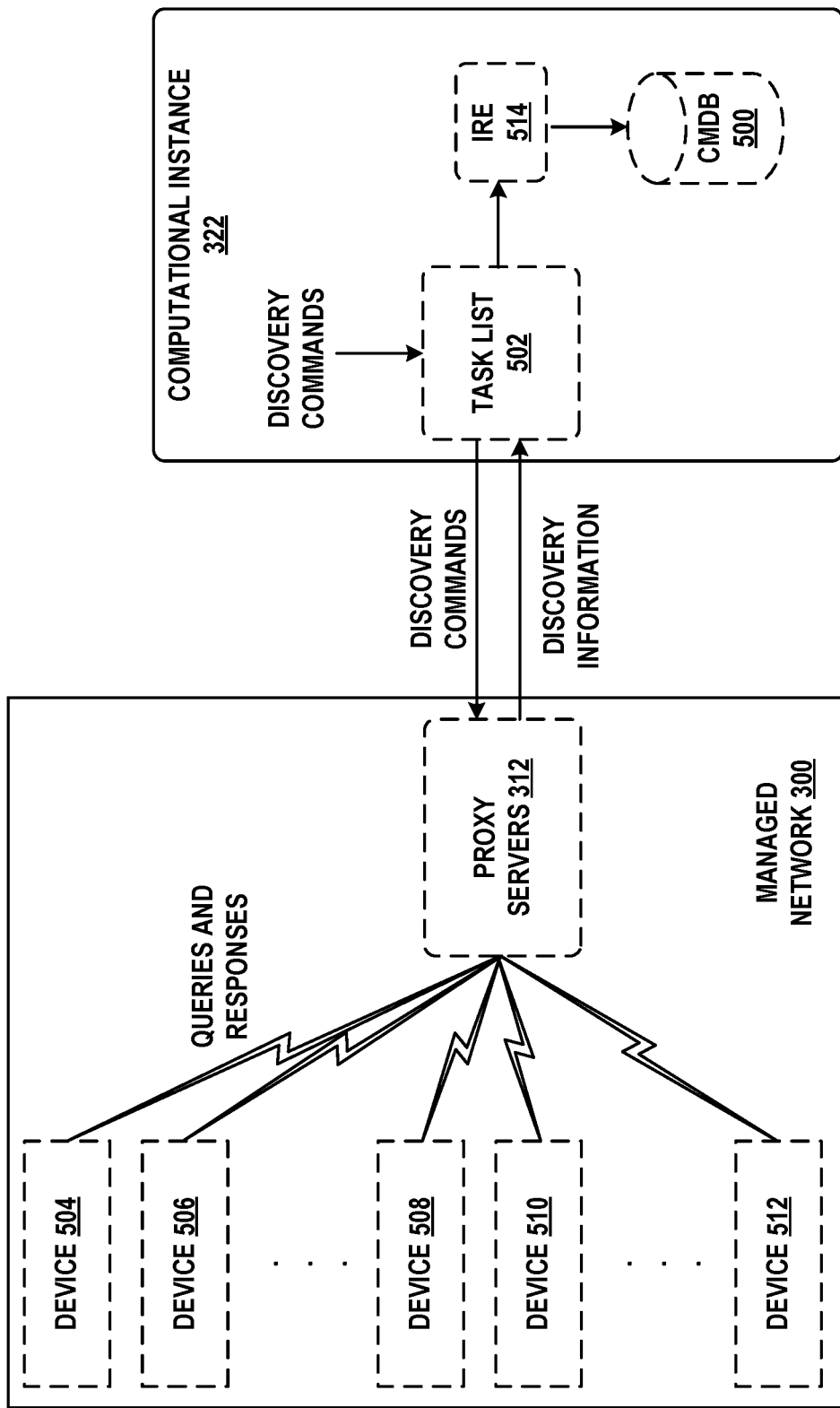
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion.

Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE EXCEPTION ENGINES

Certain datasets may include data whose accuracy must be confirmed prior to taking further actions based on the dataset. For example, some datasets (e.g., stored within the database of a bank or a corporation) may be used to submit payments to one or more creditors. Alternatively, some datasets (e.g., within a government database or an electronic health record) may be used to determine to whom confidential information should be transmitted. In one example, a database may include a series of entries. Such entries may include invoices from creditors (e.g., suppliers, contractors, or other parties), for example. Further, such invoices may be added to the database in an intake process. Additionally, it may be desirable to confirm the authenticity and accuracy of such invoices prior to initiating payment (e.g., to avoid being defrauded; to prevent overpayment or underpayment; to ensure payment goes to the proper creditor; to ensure timeliness of the payment; etc.).

In order to confirm the authenticity and accuracy of the invoices, an auditing procedure may be performed. This auditing procedure may involve reviewing and flagging invoices that include one or more errors (e.g., errors based on the amount listed, the purported creditor listed, the purported good/service listed, the payment method listed, the address listed, the account number listed, etc.) and then correcting any errors present and/or accepting/rejecting the invoices for payment. Such review can be a laborious, time-intensive procedure. Further, there are occasional times (e.g., the end of a month, the end of a quarter, etc.) where the number of invoices requiring review may increase exponentially. Hence, in many cases, it may become intractable to identify errors in each of the invoices in a timely fashion, particularly in circumstances with very large number of invoices (e.g., more than 50,000, more than 100,000, more than 250,000, more than 500,000, etc.).

In order to address the issues identified above and possibly other issues, example embodiments described herein provide exception handling techniques suited for rapidly identifying a large numbers of exceptions. The systems provided herein may reduce overall processing time of exceptions when compared with alternative automated exception processing techniques, for example. In various embodiments, the exception handling techniques may include one or more exception engines used to systematically flag exceptions. Flagging exceptions may include evaluating each invoice to determine whether one or more exceptions from among a list of previously defined exceptions applies to the respective invoice. The exceptions may indicate a potential error with the invoice. Further, invoices with identified exceptions may then be provided (e.g., to one or more users) for further review (e.g., in order to address the exceptions).

In some embodiments, the exception handling techniques described herein may include executing one or more exception engines according to a predefined period (e.g., every minute, every 5 minutes, every 10 minutes, every 15 minutes, every 30 minutes, every 60 minutes, etc.). When executed (e.g., by a processor), the exception engine may identify the available computing resources (e.g., a number of threads available within one or more processors and/or a number of workers available within an associated cloud computing service). Next, the exception engine may separate the entries into sets (e.g., using one or more predefined criteria). The entries may be separated into sets based on a maximum set size (e.g., 100 entries, 250 entries, 500 entries, 1000 entries, 2500 entries, 5000 entries, 10000 entries, etc.). After separating the entries into sets, one or more computing resources may individually analyze each set.

The entries within each set may be analyzed sequentially. However, each of the sets, themselves, may be analyzed in parallel (e.g., by making simultaneous use of two or more of the available computing resources, such as parallel threads or multiple workers, identified previously). Analyzing an individual entry may include reviewing the entry for any exceptions (e.g., any previously defined exceptions). In particular, reviewing the entry for any exceptions may include reviewing each line, character, integer, string, etc. of the entry (e.g., each line of an invoice) against a list of each of the previously defined exceptions and creating and/or updating a respective listing of exceptions associated with that entry to reflect the presence, type, location, and/or absence of exceptions. While a given entry is being reviewed for exceptions, a Boolean flag may be set to indicate that the entry is presently under review (e.g., such that the entry is not accessed by other routines during the review). The Boolean flag may be cleared upon completion of the review. Additionally or alternatively, in some embodiments, a timestamp associated with the entry may be set upon completion of the review to indicate the last time a review for exceptions was performed on the given entry. Upon completion of the review for all records within a set, the particular computing resource may begin review of another set of entries (e.g., in parallel with other sets already being reviewed by other computing resources). Once all sets within a set have been analyzed, the exception engine may cease operation (e.g., until the predefined period has elapsed, after which the exception engine may be reinitiated).

Figure 6:
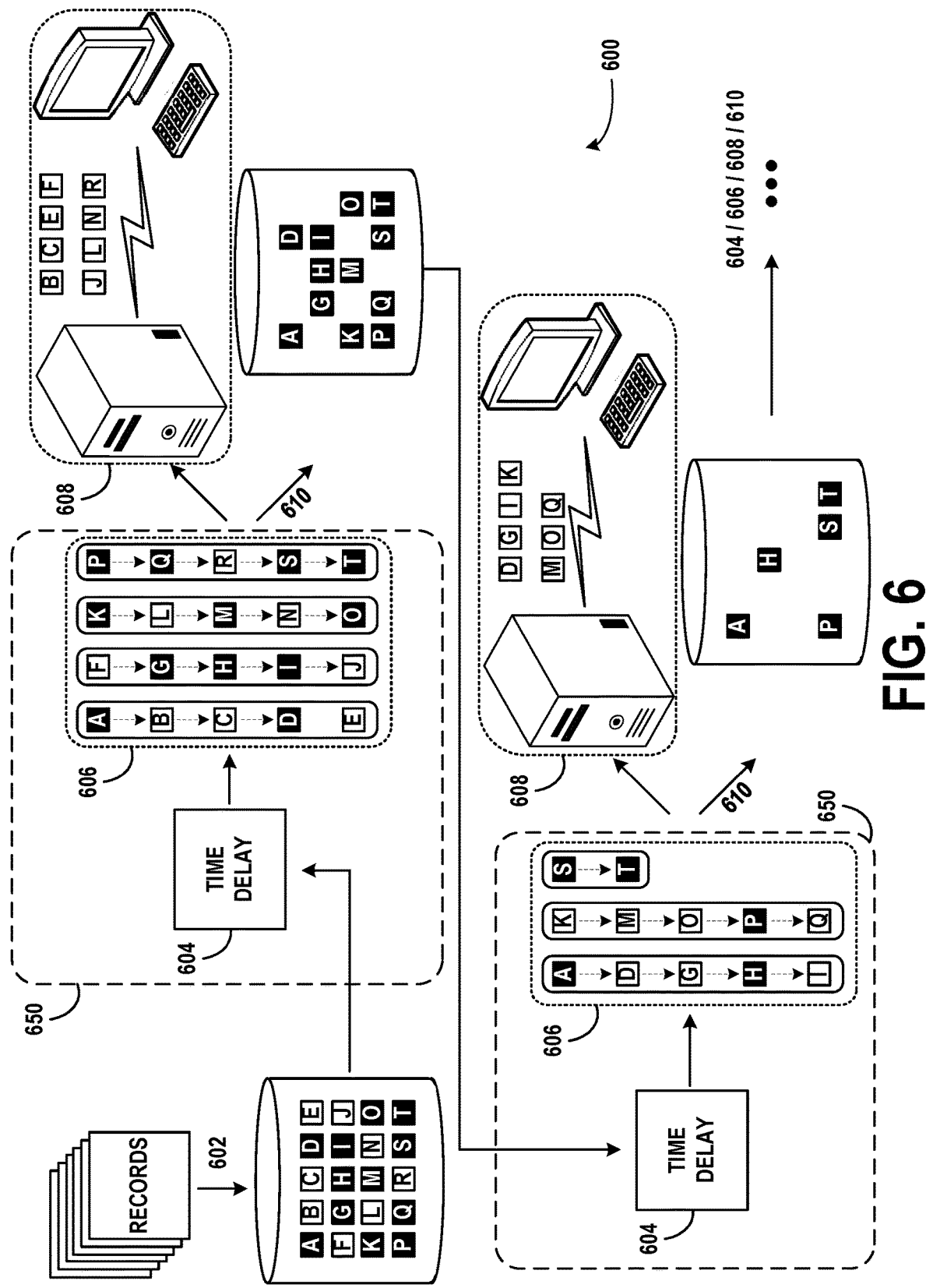
FIG. 6 illustrates a record processing technique, in accordance with example embodiments.

FIG. 6 is an illustration of a record processing technique 600, in accordance with example embodiments. In particular, the record processing technique 600 may be used to ingest records (e.g., financial invoices; medical data such as diagnostic test results, prescription information, physician notes, logs generated by applications; etc.), identify any exceptions within the records, and then transmit the records for subsequent processing when no exceptions are present. For example, the record processing technique 600 may be used to analyze a series of invoices for exceptions and then submit those invoices without exceptions for payment.

At step 602, the record processing technique 600 may include ingesting the records. The record processing technique 600 may be performed by one or more computing devices (e.g., the computing device 100 shown and described with reference to FIG. 1). Ingesting the records may include converting physical information into a digital format (e.g., scanning one or more documents in order to convert the documents into a .PDF file, a .JPEG file, a .PNG file, a .BMP file, etc.). Further, the digital documents may then be fed into a document handling tool that generates digital records (e.g., one or more database entries and/or associated metadata) associated with the digital documents. Additionally or alternative, ingesting the records may include receiving the records from one or more external sources. For example, the records may be transmitted to the one or more computing devices by one or more other computing devices (e.g., over a local network or a public network, such as the public internet). Further, step 602 may include storing the records within a database (pictured in FIG. 6 using a cylinder). Each of the records and/or portions of each of the records (e.g., each line of an invoice) may be stored as an entry within the database. For example, the records and/or portions of each of the records may be stored within a relational database (e.g., a Structured Query Language (SQL) database) within a volatile or non-volatile memory (e.g., a hard drive (HD), a solid state drive (SSD), cloud memory, flash memory, etc.). For purposes of illustration, the database entries are pictured in FIG. 6 as squares labeled with letters (e.g., 'A', 'B', 'C', etc.). Further, black squares are used to represent database entries that include one or more exceptions, whereas white squares are used to represent database entries without any exceptions present. After step 602, the record processing technique 600 may proceed to subroutine 650. Subroutine 650 may include steps 604 and 606, as illustrated in FIG. 6.

At step 604 of subroutine 650, the record processing technique 600 may include performing a time delay. The time delay may be implemented by comparing a current time (e.g., based on a system clock) to a timestamp indicative of the last time an exception analysis (e.g., the last time exception analysis 606) was performed. If the time difference is greater than or equal to a predefined period (e.g., 1 minute, 5 minutes, 10 minutes, 15 minutes, 30 minutes, 1 hour, 2 hours, 3 hours, 4 hours, 5 hours, 6 hours, 12 hours, 24 hours, 48 hours, etc.), the record processing technique 600 may proceed to step 606. If, however, the time difference is less than the predefined period, the record processing technique 600 may continue waiting before proceeding (e.g., and then again attempt to confirm whether the predefined waiting period has been satisfied at a later time). In some embodiments, the predefined period used in step 604 may be adjustable (e.g., set based on received user input indicative of a desired predefined period and/or based on available computing resources) and/or be determined based on an average amount of time required to correct exceptions across all exception types. Alternatively, in some embodiments, step 604 may not be performed (i.e., step 606 may be immediately repeated after step 602 is performed).

At step 606 of subroutine 650, the record processing technique 600 may include performing an exception analysis on the entries within the database that was populated at step 602. In some embodiments, step 606 may include analyzing subsets of the entries within the database in parallel using separate computing resources (e.g., separate processor threads, separate computing devices, separate workers within a cloud environment, etc.). This is illustrated in FIG. 6, for example, by the separate rectangles (e.g., one rectangle showing analysis of entries 'A', 'B', 'C', 'D', and 'E' for exceptions while an adjacent rectangle shows analysis of entries 'F', 'G', 'H', 'I', and 'J' for exceptions). Step 606 is further shown and described with reference to FIGS. 7A and 7B. After step 606, the record processing technique 600 may proceed to step 608 and step 610.

At step 608, the record processing technique 600 may include submitting those entries that do not have any exceptions present for further processing. Submitting an entry for further processing may include transmitting information relating to the entry (e.g., the underlying record, an invoice number, an account number, a payment amount, etc.) from one computing device (e.g., the computing device performing the analysis of step 606 or a computing device managing the analysis of step 606 by one or more other computing devices) to one or more other computing devices. For example, when the records are invoices, submitting those entries without exceptions for further processing may include transmitting a payment to the entity that originally issued the invoice or flagging the invoices for payment by a computing device authorized to initiate payments.

At step 610, the record processing technique 600 may include removing those entries that do not have any exceptions present from the database (e.g., to avoid spending unnecessary time analyzing those entries in future analysis steps). As illustrated, step 610 may be performed in parallel with step 608. In some embodiments, instead of removing the entries without exceptions from the database, step 608 may merely include updating metadata associated with the respective entries (e.g., updating metadata that indicates whether or not a respective entry requires further exception analysis and/or metadata that indicates whether or not a respective entry contains exceptions). After step 610, the record processing technique 600 may proceed to another instance of step 604 within another instance of subroutine 650.

After repeating step 604 (e.g., as described above), the record processing technique 600 may include repeating step 606 of repeated subroutine 650. As illustrated, some of the entries that previously contained one or more exceptions (e.g., entries 'D', 'G', 'I', 'K', 'M', 'O', and 'Q') may no longer contain exceptions. After step 606, the record processing technique 600 may also include repeating steps 608 and 610 (e.g., in parallel). Further, as illustrated by the ellipsis in FIG. 6, upon completion of step 610 for a second time, steps 604, 606, 608, and 610 may be repeated. For example, steps 604, 606, 608, and 610 may be repeated indefinitely, until none of the entries within the database contain an exception, or until fewer than a threshold number of entries within the database contain an exception.

As illustrated in FIG. 6, repeated instances of steps 604, 606, 608, and 610 may occur sequentially. It is understood, however, that this is provided as an example and that other embodiments are possible. For example, although the second instance of subroutine 650 is shown as beginning execution after step 610 is completed, it is understood that this might not necessarily be the case (e.g., based on the length of the time delay at step 604). For instance, in some embodiments, after completion of a first time delay at a first instance of step 604, a second instance of step 604 may begin (e.g., a second time delay may be performed). Upon completion of the second time delay (e.g., after 5 minutes, 10 minutes, 15 minutes, etc.), a second instance of step 606 may begin. The second instance of step 606 may be executed regardless of the completion status of the first instance of step 606, the first instance of step 608, and/or the first instance of step 610. In other words, multiple instances of steps 604, 606, 608, and 610 may be running in parallel (e.g., using different computing resources), in some embodiments. In this way, the techniques described herein allow for a new exception analysis at the completion of each time delay (e.g., ensures that every 5 minutes, 10 minutes, 15 minutes, etc. another exception analysis will be performed).

Figure 7A:
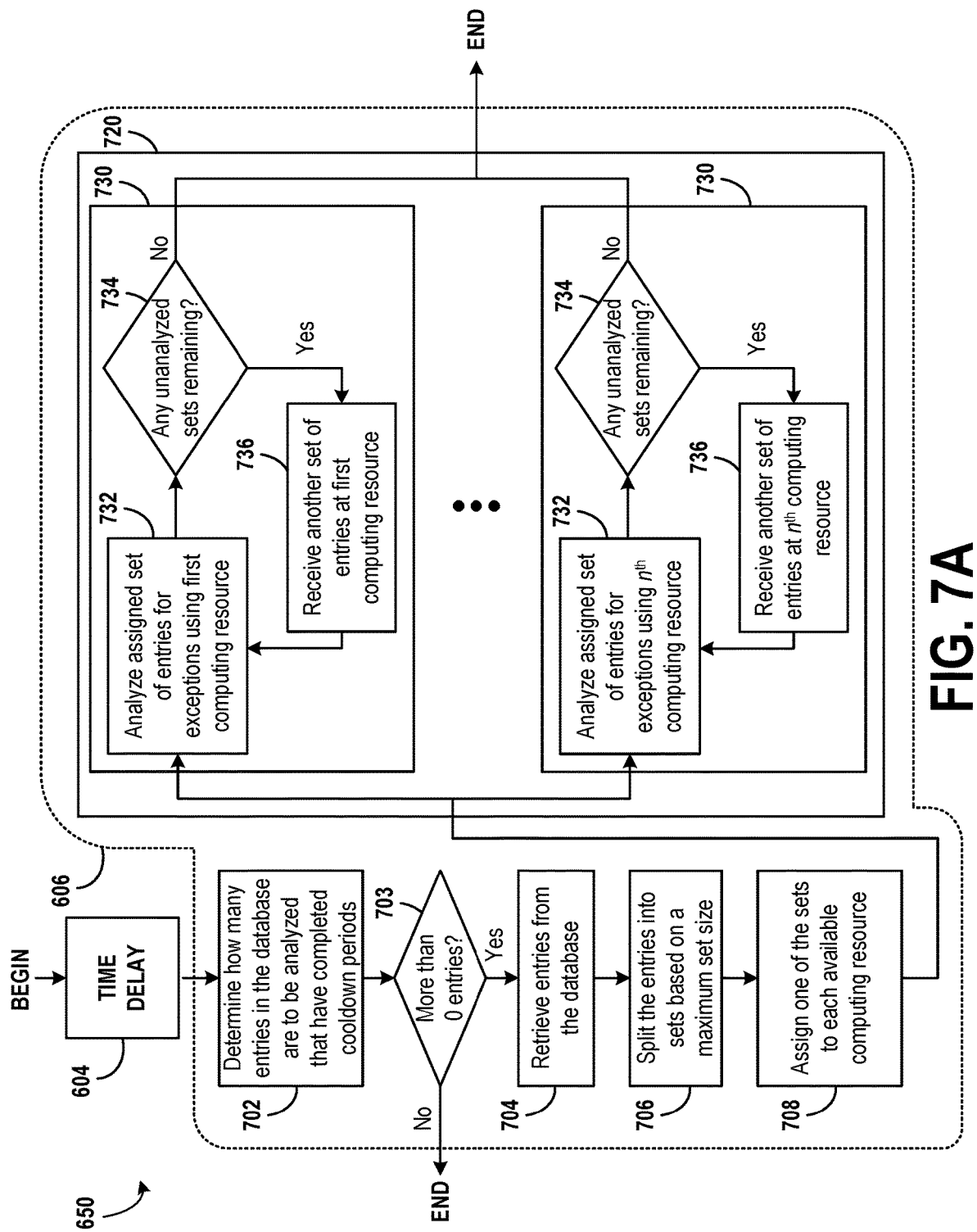
FIG. 7A illustrates an exception engine performing an exception analysis, in accordance with example embodiments.

FIG. 7A illustrates an exception engine, in accordance with example embodiments. The exception engine may perform the exception analysis of subroutine 650 of the record processing technique 600 shown and described with reference to FIG. 6, for example. In some embodiments, the exception analysis may be performed by one or more computing devices. For example, the exception analysis may be performed using the managed network 300, the remote network management platform 320, and/or the public cloud networks 340 illustrated in FIGS. 3-5. Further, the exception engine may perform the exception analysis in order to identify exceptions associated with one or more entries in a database (e.g., associated with one or more records, such as one or more invoices, one or more pieces of medical data, etc.).

In some embodiments, as illustrated in subroutine 650 in FIG. 6, performing the exception analysis may begin by executing step 604. Step 604 may include determining that a predefined period has expired (e.g., indicating that the entries within the database are to be analyzed for exceptions). As illustrated, after performing step 604, the subroutine 650 may proceed to step 702 (e.g., within broader step 606 of the subroutine 650).

At step 702, the exception analysis may include determining how many entries in the database are to be analyzed that have completed cooldown periods. Determining how many entries are to be analyzed may include determining how many entries are present within the database. Further, determining whether such entries have completed cooldown periods may include, for each entry (e.g., based on metadata associated with the given entry), comparing a time difference between the current system time and the last time an entry was analyzed for exceptions to a cooldown time (e.g., a universal cooldown time that is the same for each entry or an entry-specific cooldown time). In some embodiments, the cooldown time for a given entry may be specified in metadata associated with the given entry. Additionally or alternatively, determining how many entries are to be analyzed may include determining how many entries within the database are flagged (e.g., based on associated metadata) as having one or more previously identified exceptions and/or as requiring exception analysis. After step 702, the exception analysis may proceed to step 703.

At step 703, the exception analysis may include determining whether the number of entries (e.g., the number of entries identified in step 702) is greater than zero (i.e., determining if there is at least one entry to be analyzed). If the number of entries is greater than zero, the exception analysis may proceed to step 704. If the number of entries is not greater than zero, subroutine 650 may end. In some embodiments (e.g., as shown and described with respect to FIG. 6), upon completion of subroutine 650, steps 608 and 610 of the record processing technique 600 may follow.

At step 704, the exception analysis may include retrieving entries from the database to be analyzed for exceptions. Step 704 may include using one or more queries having one or more arguments to retrieve the entries. For example, one or more SQL queries may be used to retrieve the entries. The arguments may be used to select only those entries for which exception analysis is to be performed (e.g., those entries that are flagged for exception analysis; those entries for that are flagged as having previously identified exceptions; those entries for which an exception analysis has not yet been performed; those entries for which exception analysis was most recently performed at least a predefined cooldown time ago, such as a predefined cooldown time set based on a user input; etc.). In some embodiments, retrieving the entries at step 704 may include selecting entries (e.g., all entries in the database) that do not include an indication (e.g., stored as metadata associated with a respective entry) that the respective entry does not require further exception analysis. Further, in embodiments where the one or more entries include and/or correspond to an invoice, step 704 may include determining which of the invoices are associated with a purchase order. In such embodiments, step 704 may also include, for the invoices associated with a purchase order, retrieving the purchase order associated with the respective invoice from the database. After step 704, the exception analysis may proceed to step 706.

At step 706, the exception analysis may include splitting the entries (e.g., the entries retrieved at step 704) into one or more sets based on a maximum set size. Splitting the entries into one or more sets may include determining a set size (e.g., a common set size or a variable set size) for each of the one or more sets. In some embodiments, for example, step 706 may include determining a total number of entries to be analyzed (e.g., based on the number of entries retrieved at step 704) and determining the set size (i.e., number of entries within each set) based on the maximum set size and the total number of entries to be analyzed. Additionally or alternatively, in some embodiments, the maximum set size may be set based on the computing power (e.g., available on-board memory, clock speed, etc.) of one or more of the computing resources available to analyze the entries for exceptions. In some embodiments, the maximum set size may be 10, 25, 50, 100, 250, 500, 1000, 2500, 5000, or 10000 entries. If the total number of entries to be analyzed is less than or equal to the maximum set size, a single set may be used (e.g., a single set that has a number of entries equal to the total number of entries to be analyzed). If, however, the total number of entries to be analyzed is greater than the maximum set size, the entries may be broken up into two or more sets. For example, the entries may be broken up equally or as close to equally as possible (e.g., based on the number of entries and/or based on the file size of the entries) such that each computing resource has roughly the same computational load. Additionally or alternatively, in some embodiments, the entries assigned to each set may be assigned based on type of entry. For example, if the entries correspond to invoices, one set may be assigned only invoices that have associated purchase orders, whereas another set may be assigned only invoices without associated purchase orders. Alternatively, in order to evenly distribute the processing load, each set may include a variety of different types of entries for exception analysis. For example, when the entries correspond to invoices, each set may include a certain number of invoices having associated purchase orders and a certain number of invoices without associated purchase orders. After step 706, the exception analysis may proceed to step 708.

At step 708, the exception analysis may include assigning one of the sets (e.g., one of the sets generated in step 706) to each available computing resource (e.g., each available cloud worker, each available computing device, each available processor thread, etc.). In some embodiments, step 708 may include identifying each available computing resource for analyzing entries within the database structure (e.g., by querying a number of resources using a scheduler to determine availability) and then transmitting a set of entries to each computing resource that indicated availability. After step 708, the exception analysis may proceed to step 720.

At step 720, one or more computing resources (e.g., a first computing resource through an $n^{th}$ computing resource) may perform multiple subroutines 730 in order to review the sets of entries provided to the respective computing resource. As noted above, in various embodiments, the computing resources may take multiple different forms (e.g., different threads of a processor, different processors, different computing devices in a network, different workers in a cloud environment, etc.). It is understood that in various embodiments various numbers of computing resources could be used to perform step 720 (e.g., one computing resource, two computing resources, three computing resources, four computing resources, five computing resources, six computing resources, etc.). Further, the number of computing resources used in step 720 may be determined based on the total number of available computing resources (e.g., the total number of currently unused processor threads on a specified computing device). Alternatively, the number of computing resources used in step 720 may be determined based on a maximum number of pre-allocated computing resources (e.g., two processor threads, three processor threads, four processor threads, five processor threads, six processor threads, etc.). In some embodiments, the number of pre-allocated computing resources may be set based on a user's subscription to an aPaaS (e.g., the number of cloud workers provisioned to a given user based on that user's subscription level). As illustrated, in some embodiments the multiple subroutines 730 may be performed by multiple computing resources in parallel with one another (e.g., to concurrently analyze multiple sets of entries assigned to multiple computing resources for exceptions).

Each subroutine 730 may include multiple steps. For example, each subroutine may include steps 732, 734, and 736, as illustrated. At step 732, the subroutine 730 may include analyzing the set of entries assigned to the respective computing resource for exceptions. Step 732 is described in more detail with reference to FIG. 7B. After step 732, the subroutine 730 may proceed to step 734. At step 734, the subroutine 730 may include determining whether there are any sets (e.g., any sets established in step 706) remaining that have yet to be analyzed for exceptions. If there are sets remaining that have yet to be analyzed for exceptions, the subroutine may proceed to step 736. If there are not any sets remaining, the subroutine 730 may cease. At step 736, the subroutine 730 may include the respective computing resource receiving another set of entries for analysis and proceeding to step 732 using the newly received set of entries. Once all subroutines 730 being executed as part of step 720 have ceased, the subroutine 650 may end. In some embodiments (e.g., as shown and described with respect to FIG. 6), upon completion of subroutine 650, steps 608 and 610 of the record processing technique 600 may follow.

Figure 7B:
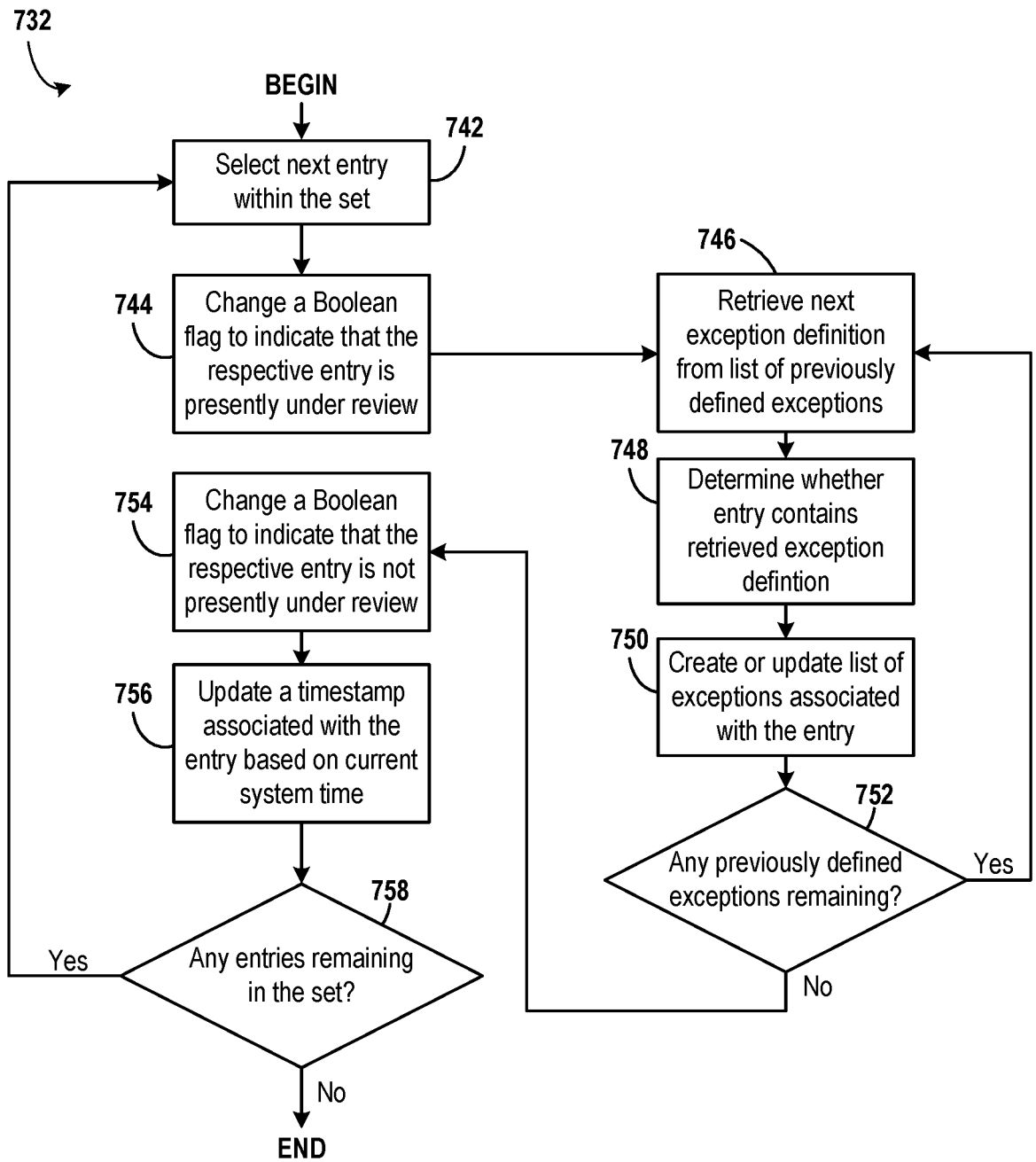
FIG. 7B illustrates a process of identifying any exceptions within entries of a set, in accordance with example embodiments.

FIG. 7B illustrates step 732 of the subroutine 730 shown and described with respect to FIG. 7A. Step 732 may include a process of identifying any exceptions within entries of a set.

At step 742, the process of identifying any exceptions may include selecting a next entry (e.g., a next unanalyzed entry) within the set. After step 742, the process of identifying any exceptions may proceed to step 744.

At step 744, the process of identifying any exceptions may include changing a Boolean flag to indicate that the respective entry (e.g., the entry selected in step 742) is presently under review. In some embodiments, the Boolean flag may be stored as metadata (e.g., within the database) that is associated with the respective entry. Such a Boolean flag may be used to indicate to other computing resources (e.g., other processor threads) and/or other programs or routines that interaction (e.g., processing) of the respective entry is currently taking place. This may prevent other computing resources, programs, or routines from reading to or writing from the entry while it is being reviewed for exceptions (e.g., to prevent data corruption and/or to ensure a proper determination about the presence or absence of exceptions can be made). After step 744, the process of identifying any exceptions may proceed to step 746.

At step 746, the process of identifying any exceptions may include retrieving a next exception definition from a list of previously defined exceptions (e.g., stored in memory, such as cloud memory, a local hard drive, etc.). In some embodiments, the list of previously defined exceptions may include user-defined exceptions. For example, a computing device may receive a user input indicative of a desired exception definition and may then update the list of the previously defined exceptions based on the user input. In embodiments where the entry corresponds to an invoice, the previously defined exceptions may include a discrepancy between a quantity of goods listed on an invoice and a quantity of goods listed on a purchase order associated with the respective invoice within the database structure, a discrepancy between a price listed on an invoice and a price listed on a purchase order associated with the respective invoice within the database structure, etc. Other exceptions are also possible and are contemplated herein (e.g., other exceptions associated with types of entries other than invoices). For example, a log entry containing an error message may be considered an exception. After step 746, the process of identifying any exceptions may proceed to step 748.

At step 748, the process of identifying any exceptions may include determining whether the entry contains the retrieved exception definition (e.g., the definition retrieved at step 746). In embodiments where the entry corresponds to an entire invoice (e.g., as opposed to the entry corresponding to only a single line of an invoice or corresponding to another type of record entirely), determining whether the entry contains the retrieved exception definition may include reviewing each line of the invoice to determine whether the defined exception is present in that line of the invoice. Alternatively, determining whether the entry contains the retrieved exception definition may include reviewing a specified portion of the invoice (e.g., a top corner for an account number) to determine whether the specified portion of the invoice contains the retrieved exception definition. Further, when the entry corresponds to an invoice with an associated purchase order, the corresponding purchase order (e.g., retrieved at step 704 of the exception analysis as shown and described with reference to FIG. 7A) may be reviewed, as well, in order to determine whether the defined exception is present. For example, one or more prices on the invoice may be compared to one or more prices on the purchase order, one or more quantities on the invoice may be compared to one or more quantities on the purchase order, one or more supplier names on the invoice may be compared to one or more supplier names on the purchase order, one or more business owners on the invoice may be compared to one or more business owners on the purchase order, etc.

In some embodiments, there may be cascaded definitions of exceptions within the list of previously defined exceptions. For example, there may be some exception types (i.e., "child exceptions") that only warrant reviewing if another type of exception (i.e., a "parent exception") was already previously identified (e.g., a price per unit of a given good on an invoice may be compared to a price per unit of the given good on an associated purchase order only when it has previously been determined that the total price on the invoice does not match the total price on the associated purchase order or a total price on an invoice may be compared to a total price on an associated purchase order only when it has previously been determined that a price per unit of a given good on the invoice does not match the price per unit of the given good on the associated purchase order). As such, in some embodiments, step 748 may also include determining, when the entry contains the retrieved exception definition, whether the retrieved exception definition represents a parent exception with one or more child exceptions. If the exception definition does represent a parent exception with one or more child exceptions, step 748 may also include retrieving the child exception definitions from the list of previously defined exceptions and then determining whether the entry contains each of the one or more retrieved child exception definitions, as well. In some embodiments, given that a parent exception is related to a child exception, resolution of one exception may inherently result in resolution of the related exception (e.g., resolution of the child exception necessarily results in a resolution of the parent exception or vice versa). As such, by cascading exception definitions, computing resources may be saved (e.g., memory may be conserved by not listing additional unnecessary exceptions associated with a given entry and/or processing power may not be used to unnecessarily check for exceptions that cannot possibly be present). After step 748, the process of identifying any exceptions may proceed to step 750.

At step 750, the process of identifying any exceptions may include creating or updating the list of exceptions associated with the entry (e.g., updating the list to include the previously defined exception if it was determined in step 748 that the respective entry contains the retrieved exception definition). The list of exceptions may include a list of each previously defined exception that has been identified as being present within the entry (e.g., and the location within the entry of the exception). Such a list may be used to prompt correction of the exception(s) (e.g., by contacting an authorized user to review and/or correct the exceptions, by initiating an automated exception-correction process, etc.). In embodiments where step 748 includes reviewing the entry for child exception definitions (e.g., after a parent exception definition has been identified within the entry), step 750 may also include creating or updating the list of exceptions associated with the given entry based on whether one or more children exceptions associated with the parent exception are present, as well. After step 750, the process of identifying any exceptions may proceed to step 752.

At step 752, the process of identifying any exceptions may include determining whether any previously defined exceptions (e.g., within the list of previously defined exceptions) have yet to be considered with respect to the present entry from the set. If there are still previously defined exceptions remaining, the process of identifying any exceptions may proceed to step 746. If there are not any previously defined exceptions remaining, the process of identifying any exceptions may proceed to step 754.

In some embodiments, subsequent to performing step 752 (e.g., when it is determined that no previously defined exceptions remain) and prior to performing step 754, if the list of exceptions associated with the respective entry indicates that no exceptions are associated with the respective entry (e.g., if the list is empty), such as when all exceptions have been corrected prior to executing step 732, the process of identifying any exceptions may also include updating metadata associated with the respective entry. Updating the metadata associated with the respective entry may include providing an indication that the respective entry does not require further exception analysis (e.g., such that the entry is not reviewed for exceptions in future exception analyses and/or so that the entry can be submitted for further processing, such as for payment when the entry corresponds to an invoice).

At step 754, the process of identifying any exceptions may include changing a Boolean flag (e.g., the Boolean flag changed at step 744) to indicate that the respective entry (e.g., the entry selected at step 742 and reviewed using steps 746, 748, 750, and 752) is not presently under review (e.g., to indicate to other threads that the respective entry can be accessed without interfering with an exception identification process). After step 754, the process of identifying any exceptions may proceed to step 756.

At step 756, the process of identifying any exceptions may include updating a timestamp (e.g., stored as metadata associated with the respective entry selected at step 742 and reviewed using steps 746, 748, 750, and 752) to indicate a time at which the respective entry was most recently analyzed for previously defined exceptions. Updating the timestamp may include setting the timestamp equal to a current system time, for example. It is understood that step 756 could be performed at other parts of the process of identifying any exceptions. For example, step 756 could instead be performed after step 742 and before step 744, after step 744 and before step 746, after step 752 and before step 754, etc. In some embodiments, the timestamp associated with the respective entry may be used to identify whether or not a sufficient cooldown time has expired such that additional exception analysis on the respective entry is warranted. For example, in some embodiments, step 704 of the exception analysis may include retrieving a preliminary superset of entries and then assigning only those entries to sets for which a predefined cooldown time since the last process of identifying any exceptions has expired. This may involve determining a time difference between the current system time and the timestamp associated with the respective entry, comparing the time difference to the predefined cooldown time, and then assigning the respective entry to one of the sets if the time difference is greater than or equal to the predefined cooldown time. Only analyzing entries for which a specific cooldown time has expired may conserve computing resources. For example, any exceptions associated with the entries may take time to resolve (e.g., time to clear the exceptions). For instance, when an exception is associated with an entry that represents an invoice, it may take some amount of time to contact an accounts payable specialist and receive a correction to the exception. Alternatively, when the exception is being handled in an automated fashion (e.g., by another computing device), sufficient time for addressing/correcting the exception may still be provisioned. As such, in order to refrain from excessively using computing resources to continually check for exceptions (when they are unlikely to have been resolved since the last check), the cooldown time may be used. The cooldown time may be one minute, two minutes, three minutes, four minutes, five minutes, one hour, two hours, three hours, four hours, five hours, one day, two days, three days, four days, five days, etc. Further, in some embodiments, the predefined cooldown time may be set by a user (e.g., a user input indicative of a desired predefined cooldown time may be received and then the predefined cooldown time may be set based on the user input). After step 756, the process of identifying any exceptions may proceed to step 758.

At step 758, the process of identifying any exceptions may include determining whether any entries remain in the set (e.g., whether any entries within the set have yet to be analyzed for exceptions). If there are remaining entries within the set that have yet to be analyzed for exceptions, the process of identifying any exceptions may proceed to step 742. If there are not any remaining entries within the set that have yet to be analyzed for exceptions, the process of identifying any exceptions may end (and, thereafter, may proceed to step 734, as shown and described with respect to FIG. 7A).

VII. EXAMPLE TECHNICAL IMPROVEMENTS

The techniques described herein provide technological improvements computer-related technology as well as to the operations of computers themselves. First, the techniques disclosed herein allow for the automation and parallelization of entry analysis for exceptions. This inherently assists in the elimination of errors from the entries, but also enhances the rate at which errors are identified. For example, if the entries were not compared to defined exceptions, time-consuming manual review may be necessary, which prolongs the error-identification timeline and, consequently, may shorten the timeline available for addressing errors (e.g., as a result of a finite amount of time being allocated to identifying and addressing errors). Further, though, without the parallelization enabled by the systematic allocation of entries to sets of entries and the distribution of those sets of entries to different computing resources, even an otherwise automated exception identification procedure would take significantly more compute time and/or consume additional computing resources.

Additionally, the techniques described herein solve a technical problem relating to database entries not being adequately progressed to subsequent downstream processes. For example, in alternative solutions, once one or more exceptions associated with database entries have been identified, the process of correcting the exceptions may be initiated. Especially in the case of multiple exceptions associated with a single entry, the rate at which the various exception corrections may progress and/or the time at which such exception corrections may conclude may vary. Therefore, it may be challenging to determine whether and when all exceptions have been resolved (e.g., when all corrections have been made). Even further, though, in order to free up computing resources (e.g., memory) for other processes, it may be desirable to remove database entries from the exception correction stage once all exceptions have been corrected. The techniques described here do so by periodically and systematically performing review of the database entries for errors. Once it is determined that a given database entry no longer contains exceptions (e.g., all exceptions have been corrected/resolved), the database entry may be removed and/or may be transmitted to another computing device (e.g., as shown and described with reference to FIG. 6). In this way, the techniques described herein enhance efficiency of data processing and data storage.

Other technical improvements may also flow from these embodiments, and other technical problems may be solved. Thus, this statement of technical improvements is not limiting and instead constitutes examples of advantages that can be realized from the embodiments.

VIII. EXAMPLE OPERATIONS

Figure 8:
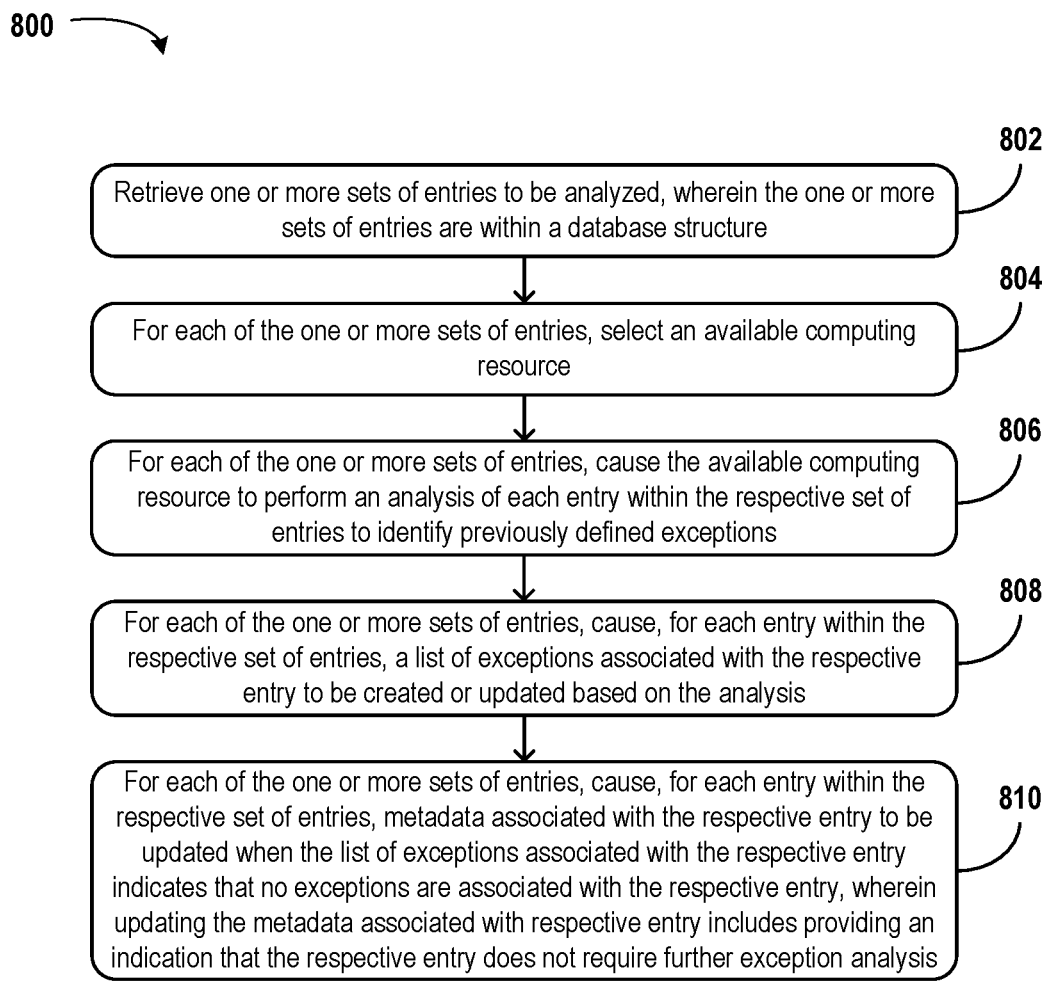
FIG. 8 is a flow chart, in accordance with example embodiments.

FIG. 8 is a flow chart illustrating an example embodiment of a method 800. The method 800 illustrated by FIG. 8 may be carried out by a computing device, such as computing device 100, and/or a cluster of computing devices, such as server cluster 200. However, the method 800 can be carried out by other types of devices or device subsystems. For example, the method 800 could be carried out by one or more computational instances of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

At block 802, the method 800 may include retrieving one or more sets of entries to be analyzed. The one or more sets of entries may be within a database structure.

At block 804, the method 800 may include, for each of the one or more sets of entries, selecting an available computing resource.

At block 806, the method 800 may include, for each of the one or more sets of entries, causing, for each entry within the respective set of entries, a list of exceptions associated with the respective entry to be created or updated based on the analysis.

At block 810, the method 800 may include, for each of the one or more sets of entries, causing, for each entry within the respective set of entries, metadata associated with the respective entry to be updated when the list of exceptions associated with the respective entry indicates that no exceptions are associated with the respective entry. Updating the metadata associated with respective entry may include providing an indication that the respective entry does not require further exception analysis.

In some embodiments, the method 800 may also include receiving a user input indicative of a desired exception definition. Further, the method 800 may include updating a list of the previously defined exceptions based on the user input. Performing the analysis of each entry within the respective set of entries to identify any previously defined exceptions may include checking the entry against the list of the previously defined exceptions.

In some embodiments, the method 800 may also include comparing a predefined period to a time elapsed since a previous analysis of the one or more sets of entries. Further, the method 800 may include determining that the predefined period is less than or equal to the time elapsed since a previous analysis of the one or more sets of entries.

In some embodiments, the method 800 may also include receiving a user input indicative of a desired predefined period. Further, the method 800 may include setting the predefined period based on the user input.

In some embodiments of the method 800, the available computing resource may include one or more available processor threads.

In some embodiments of the method 800, each of the one or more sets of entries to be analyzed may be retrieved at block 802 using one or more queries having one or more arguments.

In some embodiments, the method 800 may also include identifying available computing resources for analyzing entries within the database structure. The available computing resource may be selected from the identified available computing resources.

In some embodiments, the method 800 may also include determining a total number of entries to be analyzed. Further, the method 800 may include determining a number of entries within each of the one or more sets of entries based on a maximum set size and the total number of entries to be analyzed.

In some embodiments, the method 800 may also include determining a computing power of the available computing resource. Further, the method 800 may include setting the maximum set size based on the computing power.

In some embodiments of the method 800, block 802 may include selecting entries that do not include the indication that the respective entry does not require further exception analysis.

In some embodiments of the method 800, the metadata associated with the respective entry may include a Boolean flag used to indicate whether the respective entry is presently under review. The method 800 may also include, for each of the one or more sets of entries, causing, prior to the available computing resource performing the analysis of the respective entry, the available computing resource to change the Boolean flag to indicate that the respective entry is presently under review. Further, the method 800 may include, for each of the one or more sets of entries, causing, subsequent to the available computing resource performing the analysis of the respective entry, the available computing resource to change the Boolean flag to indicate that the respective entry is not presently under review.

In some embodiments of the method 800, the metadata associated with each of the respective entries may include a timestamp used to indicate a time at which the respective entry was most recently analyzed for previously defined exceptions. The method 800 may also include, for each of the one or more sets of entries, causing, prior to or subsequent to the available computing resource performing the analysis of each entry within the respective set of entries, the available computing resource to update the timestamps associated with each entry within the respective set of entries to reflect a current system time.

In some embodiments of the method 800, block 802 may include retrieving a preliminary superset of entries. Additionally, block 802 may include, for each entry in the superset of entries, determining a time difference between the current system time and the timestamp associated with the respective entry. Further, block 802 may include, for each entry in the superset of entries, comparing the time difference to a predefined cooldown time. In addition, block 802 may include, for each entry in the superset of entries, assigning the respective entry to one of the one or more sets of entries when the time difference is greater than or equal to the predefined cooldown time.

In some embodiments, the method 800 may also include receiving a user input indicative of a desired predefined cooldown time. Further, the method 800 may include setting the predefined cooldown time based on the user input.

In some embodiments of the method 800, each of the one or more entries may include an invoice. Further, the previously defined exceptions may include a discrepancy between a quantity of goods listed on an invoice and a quantity of goods associated with the respective invoice within the database structure or a discrepancy between a price listed on an invoice and a price associated with the respective invoice within the database structure.

In some embodiments of the method 800, each of the one or more entries may include an invoice. Further, block 802 may include determining which of the invoices are associated with a purchase order. Additionally, block 802 may also include, for the invoices associated with a purchase order, retrieving the purchase order associated with the respective invoice from the database structure. In addition, performing the analysis of the entries that are associated with a purchase order to identify previously defined exceptions may include: comparing one or more prices on the invoice with one or more prices on the associated purchase order or comparing one or more quantities on the invoice with one or more quantities on the associated purchase order.

In some embodiments of the method 800, each of the one or more entries may include an invoice. Further, the method 800 may include identifying one or more entries having associated metadata that includes indications that the respective entry does not require further exception analysis. Additionally, the method 800 may include submitting the invoices of the one or more identified entries for payment.

In some embodiments of the method 800, for a first set of the one or more sets of entries, selecting the available computing resource may include selecting a first available computing resource from among a set of available computing resources. Additionally, for a second set of the one or more sets of entries, selecting the available computing resource may include selecting a second available computing resource from among a set of available computing resources. Further, for the first set of the one or more sets of entries, causing the available computing resource to perform the analysis of each entry within the first set of entries to identify previously defined exceptions may include causing the first available computing resource to perform the analysis of each entry within the first set of entries to identify previously defined exceptions. In addition, for the second set of the one or more sets of entries, causing the available computing resource to perform the analysis of each entry within the second set of entries to identify previously defined exceptions may include causing the second available computing resource to perform the analysis of each entry within the second set of entries to identify previously defined exceptions. Yet further, the analysis by the first available computing resource of each entry within the first set of entries to identify previously defined exceptions may be performed in parallel with the analysis by the second available computing resource of each entry within the second set of entries to identify previously defined exceptions.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    retrieving one or more sets of entries to be analyzed, wherein the one or more sets of entries are within a database structure; and
    for each of the one or more sets of entries:
        selecting an available computing resource;
        causing the available computing resource to perform an analysis of each entry within the respective set of entries to identify previously defined exceptions;
        causing, for each entry within the respective set of entries, a list of exceptions associated with the respective entry to be created or updated based on the analysis; and
        causing, for each entry within the respective set of entries, metadata associated with the respective entry to be updated when the list of exceptions associated with the respective entry indicates that no exceptions are associated with the respective entry, wherein updating the metadata associated with respective entry comprises providing an indication that the respective entry does not require further exception analysis,
    wherein, for a first set of the one or more sets of entries, selecting the available computing resource comprises selecting a first available computing resource from among a set of available computing resources,
    wherein, for a second set of the one or more sets of entries, selecting the available computing resource comprises selecting a second available computing resource from among a set of available computing resources,
    wherein, for the first set of the one or more sets of entries, causing the available computing resource to perform the analysis of each entry within the first set of entries to identify previously defined exceptions comprises causing the first available computing resource to perform the analysis of each entry within the first set of entries to identify previously defined exceptions,
    wherein, for the second set of the one or more sets of entries, causing the available computing resource to perform the analysis of each entry within the second set of entries to identify previously defined exceptions comprises causing the second available computing resource to perform the analysis of each entry within the second set of entries to identify previously defined exceptions, and
    wherein the analysis by the first available computing resource of each entry within the first set of entries to identify previously defined exceptions is performed in parallel with the analysis by the second available computing resource of each entry within the second set of entries to identify previously defined exceptions.

2. The method of claim 1, further comprising:
    receiving a user input indicative of a desired exception definition; and
    updating a list of the previously defined exceptions based on the user input,
    wherein performing the analysis of each entry within the respective set of entries to identify any previously defined exceptions comprises checking the entry against the list of the previously defined exceptions.

3. The method of claim 1, further comprising:
    comparing a predefined period to a time elapsed since a previous analysis of the one or more sets of entries; and
    determining that the predefined period is less than or equal to the time elapsed since a previous analysis of the one or more sets of entries.

4. The method of claim 3, further comprising:
    receiving a user input indicative of a desired predefined period; and
    setting the predefined period based on the user input.

5. The method of claim 1, wherein the available computing resource comprises one or more available processor threads.

6. The method of claim 1, wherein each of the one or more sets of entries to be analyzed is retrieved using one or more queries having one or more arguments.

7. The method of claim 1, further comprising identifying available computing resources for analyzing entries within the database structure, wherein the available computing resource is selected from the identified available computing resources.

8. The method of claim 1, further comprising:
    determining a total number of entries to be analyzed; and
    determining a number of entries within each of the one or more sets of entries based on a maximum set size and the total number of entries to be analyzed.

9. The method of claim 8, further comprising:
    determining a computing power of the available computing resource; and
    setting the maximum set size based on the computing power.

10. The method of claim 1, wherein retrieving the one or more sets of entries comprises selecting entries that do not include the indication that the respective entry does not require further exception analysis.

11. The method of claim 1,
    wherein the metadata associated with the respective entry comprises a Boolean flag used to indicate whether the respective entry is presently under review, and
    wherein the method further comprises, for each of the one or more sets of entries:
        causing, prior to the available computing resource performing the analysis of the respective entry, the available computing resource to change the Boolean flag to indicate that the respective entry is presently under review; and
        causing, subsequent to the available computing resource performing the analysis of the respective entry, the available computing resource to change the Boolean flag to indicate that the respective entry is not presently under review.

12. The method of claim 1,
wherein the metadata associated with each of the respective entries comprises a timestamp used to indicate a time at which the respective entry was most recently analyzed for previously defined exceptions, and
wherein the method further comprises, for each of the one or more sets of entries:
causing, prior to or subsequent to the available computing resource performing the analysis of each entry within the respective set of entries, the available computing resource to update the timestamps associated with each entry within the respective set of entries to reflect a current system time.

13. The method of claim 12, wherein retrieving the one or more sets of entries to be analyzed comprises:
retrieving a preliminary superset of entries; and
for each entry in the superset of entries:
determining a time difference between the current system time and the timestamp associated with the respective entry;
comparing the time difference to a predefined cooldown time; and
assigning the respective entry to one of the one or more sets of entries when the time difference is greater than or equal to the predefined cooldown time.

14. The method of claim 13, further comprising:
receiving a user input indicative of a desired predefined cooldown time; and
setting the predefined cooldown time based on the user input.

15. The method of claim 1,
wherein each of the one or more entries comprises an invoice, and
wherein the previously defined exceptions comprise a discrepancy between a quantity of goods listed on an invoice and a quantity of goods associated with the respective invoice within the database structure or a discrepancy between a price listed on an invoice and a price associated with the respective invoice within the database structure.

16. The method of claim 1,
wherein each of the one or more entries comprises an invoice,
wherein retrieving the one or more sets of entries to be analyzed comprises:
determining which of the invoices are associated with a purchase order; and
for the invoices associated with a purchase order, retrieving the purchase order associated with the respective invoice from the database structure, and
wherein performing the analysis of the entries that are associated with a purchase order to identify previously defined exceptions comprises:
comparing one or more prices on the invoice with one or more prices on the associated purchase order; or
comparing one or more quantities on the invoice with one or more quantities on the associated purchase order.

17. The method of claim 1,
wherein each of the one or more entries comprises an invoice, and
wherein the method further comprises:
identifying one or more entries having associated metadata comprising indications that the respective entry does not require further exception analysis; and
submitting the invoices of the one or more identified entries for payment.

18. The method of claim 1, wherein the one or more sets of entries comprises more than 50,000 entries.

19. A non-transitory computer-readable medium, having stored thereon program instructions that, upon execution by a computing system, cause the computing system to perform operations comprising:
retrieving one or more sets of entries to be analyzed, wherein the one or more sets of entries are within a database structure; and
for each of the one or more sets of entries:
selecting an available computing resource;
causing the available computing resource to perform an analysis of each entry within the respective set of entries to identify previously defined exceptions;
causing, for each entry within the respective set of entries, a list of exceptions associated with the respective entry to be created or updated based on the analysis; and
causing, for each entry within the respective set of entries, metadata associated with the respective entry to be updated when the list of exceptions associated with the respective entry indicates that no exceptions are associated with the respective entry,
wherein updating the metadata associated with respective entry comprises providing an indication that the respective entry does not require further exception analysis,
wherein, for a first set of the one or more sets of entries, selecting the available computing resource comprises selecting a first available computing resource from among a set of available computing resources,
wherein, for a second set of the one or more sets of entries, selecting the available computing resource comprises selecting a second available computing resource from among a set of available computing resources,
wherein, for the first set of the one or more sets of entries, causing the available computing resource to perform the analysis of each entry within the first set of entries to identify previously defined exceptions comprises causing the first available computing resource to perform the analysis of each entry within the first set of entries to identify previously defined exceptions,
wherein, for the second set of the one or more sets of entries, causing the available computing resource to perform the analysis of each entry within the second set of entries to identify previously defined exceptions comprises causing the second available computing resource to perform the analysis of each entry within the second set of entries to identify previously defined exceptions, and
wherein the analysis by the first available computing resource of each entry within the first set of entries to identify previously defined exceptions is performed in parallel with the analysis by the second available computing resource of each entry within the second set of entries to identify previously defined exceptions.

20. A system comprising:
one or more processors; and
memory, containing program instructions that, upon execution by the one or more processors, cause the system to perform operations comprising:
retrieving one or more sets of entries to be analyzed, wherein the one or more sets of entries are within a database structure; and
for each of the one or more sets of entries:
selecting an available computing resource;

causing the available computing resource to perform an analysis of each entry within the respective set of entries to identify previously defined exceptions;

causing, for each entry within the respective set of entries, a list of exceptions associated with the respective entry to be created or updated based on the analysis; and causing, for each entry within the respective set of entries, metadata associated with the respective entry to be updated when the list of exceptions associated with the respective entry indicates that no exceptions are associated with the respective entry, wherein updating the metadata associated with respective entry comprises providing an indication that the respective entry does not require further exception analysis, wherein, for a first set of the one or more sets of entries, selecting the available computing resource comprises selecting a first available computing resource from among a set of available computing resources, wherein, for a second set of the one or more sets of entries, selecting the available computing resource comprises selecting a second available computing resource from among a set of available computing resources, wherein, for the first set of the one or more sets of entries, causing the available computing resource to perform the analysis of each entry within the first set of entries to identify previously defined exceptions comprises causing the first available computing resource to perform the analysis of each entry within the first set of entries to identify previously defined exceptions, wherein, for the second set of the one or more sets of entries, causing the available computing resource to perform the analysis of each entry within the second set of entries to identify previously defined exceptions comprises causing the second available computing resource to perform the analysis of each entry within the second set of entries to identify previously defined exceptions, and wherein the analysis by the first available computing resource of each entry within the first set of entries to identify previously defined exceptions is performed in parallel with the analysis by the second available computing resource of each entry within the second set of entries to identify previously defined exceptions.

* * * * *